United States Patent [19]

Ichinohe et al.

[11] 4,409,267

[45] Oct. 11, 1983

[54] METHOD FOR THE FINISHING TREATMENT OF FABRIC MATERIALS

[75] Inventors: Shoji Ichinohe; Katsusuke Kasahara, both of Annaka, Japan

[73] Assignee: Shin-Etsu Chemical Co., Ltd., Tokyo, Japan

[21] Appl. No.: 366,761

[22] Filed: Apr. 8, 1982

[30] Foreign Application Priority Data

Apr. 15, 1981 [JP] Japan .................................. 56-56580

[51] Int. Cl.$^3$ .............................................. B05D 3/02
[52] U.S. Cl. .................................... 427/387; 156/329; 252/8.8; 252/8.9; 427/389.9; 427/393.1; 427/393.4
[58] Field of Search ................. 427/387, 389.9, 393.1, 427/393.4; 252/8.8, 8.9; 156/329

[56] References Cited

U.S. PATENT DOCUMENTS

| | | | |
|---|---|---|---|
| 3,419,423 | 12/1968 | Quaal | 427/393.4 X |
| 4,105,567 | 8/1978 | Koerner et al. | 252/8.6 |
| 4,283,191 | 8/1981 | Koerner et al. | 252/8.9 X |
| 4,293,611 | 10/1981 | Martin | 427/393.4 X |
| 4,311,626 | 1/1982 | Ona et al. | 252/8.8 |
| 4,365,967 | 12/1982 | Guth et al. | 427/393.4 X |

Primary Examiner—Michael R. Lusignan
Assistant Examiner—Thurman K. Page
Attorney, Agent, or Firm—Hopgood, Calimafde, Kalil, Blaustein & Judlowe

[57] ABSTRACT

The invention provides a novel method for the finishing treatment of a fabric material with a silicone-containing fabric treatment agent, according to which the treated fabric material is imparted with a very pleasant touch with softness and hydrophilicity in contrast to the conventional methods of fabric treatment with silicones in which the treated fabric material is always imparted with water repellency. The inventive method is characteristic in the use of an organopolysiloxane having, in a molecule, at least one polyoxyalkylene pendant group bonded to the silicon atom and at least one amino-containing group such as —O—CH$_2$—CHOH—CH$_2$—NH$_2$ bonded to the silicon atoms, as the effective ingredient of the silicone-based fabric treatment agent. Preparation of such organopolysiloxane compounds is disclosed.

1 Claim, No Drawings

METHOD FOR THE FINISHING TREATMENT OF FABRIC MATERIALS

BACKGROUND OF THE INVENTION

The present invention relates to a novel method for the finishing treatment of fabric materials to which pleasant touch of softness and hydrophilicity can be imparted simultaneously. In particular, the present invention provides a novel method for the finishing treatment of fabric materials with a fabric-treatment agent containing an organopolysiloxane of a novel type as the effective ingredient thereof.

As is well known, various types of silicones or organopolysiloxane materials are known as a fabric-treatment agent to impart pleasant touch with softness and water-repellency to the fabric material. No silicones are known hitherto, however, which can impart simultaneously pleasant touch with softness and hydrophilicity to the fabric material.

That is, most of the conventional silicones for the fabric treatment are satisfactory in respect of the softness of the fabric material finished therewith but the fabric materials treated with a silicone are almost always rendered water repellent irrespective of the necessity of such water repellency. Therefore, silicone-containing fabric finishing agents cannot be used when water repellency of the treated fabric material is undesirable. It is of course possible that an organopolysiloxane is rendered hydrophilic by modifying the molecular structure thereof with introduction of hydrophilic groups. Such a conventional approach of the modification of the molecular structure is not free from the problem that the fabric material treated with such a modified silicone cannot be imparted with desired degree of softness as the other important object of the fabric treatment. Further, on the other hand, the prior art silicone-containing fabric finishing agents with excellent softening effect are not always satisfactory in respect of the adhesion to the surface of the fibers and the hydrophilicity of the fabric materials treated therewith.

SUMMARY OF THE INVENTION

It is therefore an object of the present invention to impart excellent touch with softness and hydrophilicity simultaneously to a fabric material. Another object of the invention is to provide a novel and improved fabric finishing agent comprising an organopolysiloxane as the effective ingredient thereof, with which fabric materials can be imparted with excellent touch with softness and hydrophilicity simultaneously.

The method of the present invention for imparting excellent touch with softness and hydrophilicity simultaneously to a fabric material comprises applying, to the fabric material, a liquid composition comprising, as the effective ingredient thereof, an organopolysiloxane represented by the general formula

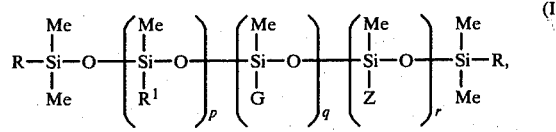

in which Me is a methyl group; $R^1$ is a hydrogen atom or a monovalent hydrocarbon group having from 1 to 14 carbon atoms; G is a polyoxyalkylene group represented by the general formula

$R^2$ being a hydrogen atom or a monovalent hydrocarbon group having from 1 to 20 carbon atoms, x being a number of 0, 1, 2 or 3 and y and z each being zero or a positive integer not exceeding 200 with the proviso that $y+z$ cannot be equal to zero; Z is an amino-containing group represented by the general formula

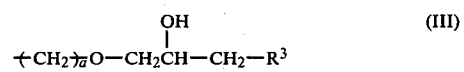

or

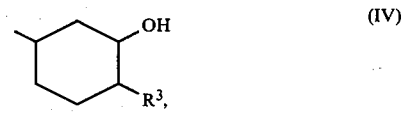

a being zero or 3 and $R^3$ being a substituted or unsubstituted amino group; R is a group selected from $R^1$, G and Z; and p, q and r are each a positive integer not exceeding 800, and drying the fabric material wet with the liquid composition.

DETAILED DESCRIPTION OF THE PREFERRED EMBODIMENTS

The above described effective ingredient of the silicone-containing fabric finishing agent used in the inventive method is an organopolysiloxane having the polyoxyalkylene groups (II) and the amino-containing organic groups (III) or (IV). This organopolysiloxane represented by the general formula (I) is readily soluble or dispersible in water. By virtue of the high affinity of this organopolysiloxane to water, the fabric material treated with the fabric finishing agent is imparted with good hydrophilicity and pleasant touch with softness simultaneously. In addition, the thus treated fabric material is highly susceptible to the adhesive bonding by use of a hot-melt type adhesive agent contributing to the improvement of the working efficiency.

The organopolysiloxane of the general formula (I) has at least one amino-containing organic group Z bonded to the silicon atoms. Such an amino-containing organic group Z can be introduced by the addition reaction of an amine compound of the formula $HR^3$ with an organopolysiloxane having an epoxy-containing organic group or groups Z' bonded to the silicon atoms, where Z' is an epoxy-containing organic group of the formula

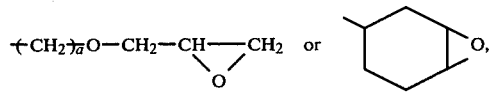

$R^3$ and a being the same as defined above.

Such an organopolysiloxane having the polyoxyalkylene groups denoted by G and the epoxy-containing organic groups denoted by Z' may be prepared, for example, by the hydrosilation reaction or dehydrogenation reaction of a corresponding organopolysiloxane represented by the general formula

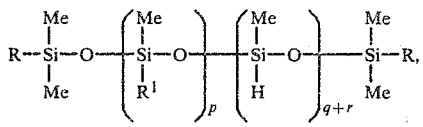

(V)

in which R, R$^1$, Me, p, q and r each have the same meaning as defined above, with a polyoxyalkylene compound and an epoxy compound having a hydroxy group or an ethylenic unsaturation in the respective molecules in the presence of a platinum catalyst such as chloroplatinic acid.

The epoxy compound used in the above mentioned reaction is an expoxy compound having a hydroxy group or an ethylenic unsaturation in the molecule exemplified by allyl glycidyl ether, glycidol, 1,4-cyclohexadiene monoxide and the like. The above mentioned reaction of hydrosilation or dehydrogenation is carried out, preferably, by diluting the organopolysiloxane with an organic solvent which may be an alcoholic solvent, aliphatic hydrocarbon solvent, aromatic hydrocarbon solvent, ester solvent, chlorinated hydrocarbon solvent or the like. If desired, an acidity moderator such as potassium acetate may be used in the reaction. The reaction temperature is preferably in the range from −20° C. to 180° C. or, more preferably, from 60° C. to 150° C.

The next step is the reaction of an amine compound HR$^3$ with the thus obtained organopolysiloxane having the polyoxyalkylene groups G and the epoxy groups Z'. This reaction is carried out either by adding the amine compound to the reaction mixture from the hydrosilation or dehydrogenation reaction as such or the organopolysiloxane isolated from the reaction mixture with the organic solvent removed by distillation under reduced pressure. The reaction mixture after the reaction with the amine compound is subjected to a conventional processing procedure such as filtration, stripping of the solvent and the like to give the desired organopolysiloxane of the general formula (I) having the polyoxyalkylene groups G and the amino-containing organic groups Z bonded to the silicon atoms.

The amine compound used in the above described reaction is exemplified by ammonia; primary amines such as triethylene tetramine, ethylene diamine, ethylamine, cyclohexylamine, octylamine, allylamine, aniline, benzylamine, phenethylamine, monoethanolamine and the like and secondary amines such as dimethylamine, diethylamine, dibutylamine, N-methylaniline, methyl benzylamine, diphenylamine, morpholine, piperidine, N-methylpiperazine, diethanolamine and the like.

It is further optional that the amine compound is a silicon-containing amine compound such as 3-triethoxysilylpropyl amine, 3-diethoxymethylsilylpropyl amine, N-(3-trimethylsilylpropyl)ethylenediamine, N-(3-dimethoxymethylsilylpropyl)amine and the like.

The reaction of the amine compound with the epoxy-containing organopolysiloxane may be carried out by diluting the reaction mixture with an organic solvent such as an alcoholic solvent, aliphatic hydrocarbon solvent, aromatic hydrocarbon solvent, chlorinated hydrocarbon solvent, ester solvent, ether solvent and others although the reaction may proceed without dilution with an organic solvent. The reaction is usually undertaken under atmospheric pressure but may be carried out under pressurization according to need. The reaction temperature is in the range from −75° C. to 180° C. or, preferably, from 0° C. to 140° C.

The above described organopolysiloxane having the polyoxyalkylene groups and the amino-containing organic groups is the effective ingredient in the fabric finishing agent used in the inventive method and the organopolysiloxane is usually used in the form of an aqueous solution or aqueous dispersion which optionally contains various kinds of additives such as emulsifying agents, lubricants, synthetic resins for fabric finishing and the like according to need.

According to the invention, the fabric material is soaked with the aqueous solution or aqueous dispersion comprising the organopolysiloxane followed by drying, preferably, with heating.

In the following, the present invention is described in further detail by way of examples, in which the preparation of several of the organopolysiloxanes having the polyoxyalkylene groups and the amino-containing organic groups is first given. In the following description, Me and Bu each denote a methyl group and a butyl group, respectively.

Preparation 1

Into a reaction vessel were introduced 1.898 g (0.83 mole) of a polyoxyalkylene allyl butyl ether expressed by the formula

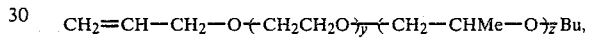

in which y and z were equal to each other, having an average molecular weight of about 2,300, 28.5 g (0.25 mole) of allyl glycidyl ether, 2,500 g of isopropyl alcohol, 0.5 g of potassium acetate and 0.01 g of chloroplatinic acid to form a reaction mixture and, while the reaction mixture was heated under reflux at a temperature of about 83° C., 894 g (0.125 mole) of a methylhydrogenpolysiloxane expressed by the formula

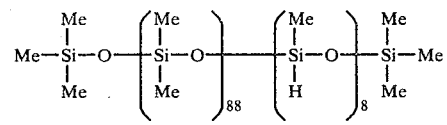

were added thereto dropwise over a period of 2 hours followed by further continued heating of the mixture under reflux at about 83° C. for 5 hours. Thereafter, the temperature of the reaction mixture was decreased to 70° C. and 150 g (2.5 moles) of ethylenediamine were added thereto followed by further heating under reflux for 2 hours.

The thus obtained reaction mixture was freed from the solvent by distilling under reduced pressure and filtered to give 2,552 g of a polyoxyalkylene aminopolysiloxane expressed by the following formula, which is referred to as the silicone I hereinafter:

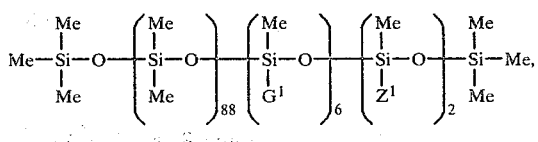

in which G$^1$ was a group

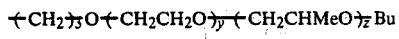

and $Z^1$ was a group

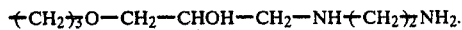

This organopolysiloxane product had a viscosity of 2,500 centistokes at 25° C., refractive index $n_D^{25}$ of 1.4450 and amine equivalent of 5,100.

Preparation 2

Into a reaction vessel were introduced 350 g (0.8 mole) of a polyoxyalkylene allyl methyl ether expressed by the formula

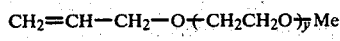

having an average molecular weight of 438, 1,000 g of toluene, 0.1 g of potassium acetate and 0.1 g of a 0.3% solution of chloroplatinic acid in 2-ethylhexyl alcohol to form a reaction mixture and, while the reaction mixture was heated under reflux at a temperature of about 115° C., 735 g (0.067 mole) of a methylhydrogenpolysiloxane expressed by the formula

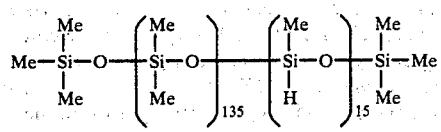

were added thereto dropwise over a period of 1 hour followed by the addition of 23 g (0.2 mole) of allyl glycidyl ether and heating of the reaction mixture under reflux at about 115° C. for additional 8 hours. Thereafter, the reaction mixture was freed of the solvent by distillation under reduced pressure to give a polyoxyalkylene epoxypolysiloxane.

Into another reaction vessel were introduced 997 g (0.060 mole) of the above obtained polyoxyalkylene epoxypolysiloxane, 1 liter of isopropyl alcohol and 12 g (0.2 mole) of ethylenediamine and the thus formed reaction mixture was heated under reflux at a temperature of about 83° C. for 3 hours to effect the reaction of the ethylenediamine and the epoxy groups of the polysiloxane.

Thus obtained reaction mixture was freed of the solvent by distillation under reduced pressure followed by filtration to give 950 g of the polyoxyalkylene aminopolysiloxane, referred to as the silicone II hereinafter, expressed by the following formula

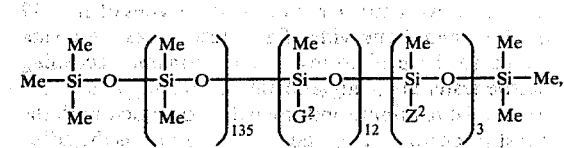

in which $G^2$ was a group

and $Z^2$ was a group

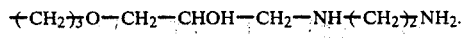

This organopolysiloxane product had a viscosity of 640 centistokes at 25° C., refractive index $n_D^{25}$ of 1.4355 and amine equivalent of 2,800.

Preparation 3

Into a reaction vessel were introduced 457 g of a methylhydrogenpolysiloxane expressed by the formula

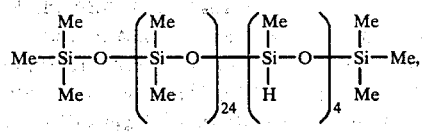

1,898 g of the same polyoxyalkylene allyl butyl ether as used in Preparation 1 above, 28.5 g of allyl glycidyl ether, 0.1 g of potassium acetate, 0.1 g of chloroplatinic acid and 1,000 g of isopropyl alcohol to form a reaction mixture and the reaction mixture was heated under reflux at a temperature of about 83° C. for 5 hours to effect the reaction.

Thereafter, 103 g of N-(3-methyldimethoxysilylpropyl)ethylene diamine of the formula

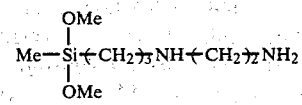

were added to the reaction mixture and the reaction was carried out at 83° C. for 2 hours under a nitrogen gas stream.

The thus obtained reaction mixture was freed of the solvent by distillation under reduced pressure followed by filtration to give 2,335 g of a polyoxyalkylene aminopolysiloxane, referred to as the silicone III hereinafter, expressed by the following formula

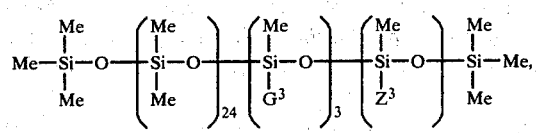

in which $G^3$ was a group

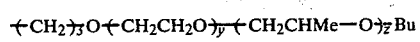

and $Z^3$ was a group

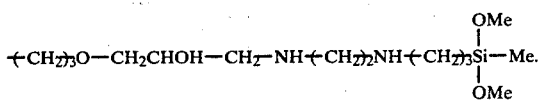

This organopolysiloxane product had a viscosity of 1,700 centistokes at 25° C., refractive index $n_D^{25}$ of 1.4481 and amine equivalent of 5,300.

Preparation 4

Into a reaction vessel were introduced 373 g of a methylhydrogenpolysiloxane expressed by the formula

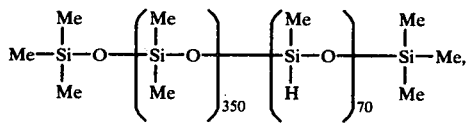

460 g of the same polyoxyalkylene allyl butyl ether as used in Preparation 1 above, 0.5 g of chloroplatinic acid, 0.1 g of potassium acetate and 600 g of isopropyl alcohol to form a reaction mixture and the reaction was performed by heating the reaction mixture under reflux at a temperature of about 83° C. for 4 hours.

The solvent was removed from this reaction mixture by distillation under reduced pressure to give an oily material having a viscosity of 5,290 centistokes at 25° C.

Into another reaction vessel were introduced 190 g of the above obtained oily material, 10 g of a partial hydrolysis condensation product of N-(3-methyldimethoxysilylpropyl)ethylenediamine of the formula

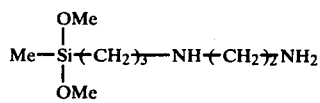

and 0.5 g of potassium hydroxide and the reaction carried out for 5 hours at 150° C. was followed by neutralization with addition of ethylenechlorohydrin and stripping of the solvent to give 195 g of a polyoxyalkylene aminopolysiloxane, referred to as the silicone IV hereinafter.

This organopolysiloxane product had a viscosity of 665 centistokes at 25° C. and refractive index $n_D^{25}$ of 1.4435.

EXAMPLE 1

The silicones I to IV prepared in the above Preparations were used for the finishing treatment of a fabric material to evaluate their effectiveness as a fabric finishing agent in respect of the touch, susceptibility to adhesive bonding and water absorption of the treated fabrics.

For comparison, three conventional silicones V, VI and VII were tested in the same manner. The silicone V was a polyoxyalkylene-containing diorganopolysiloxane expressed by the formula

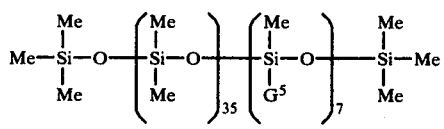

in which the polyoxyalkylene pendant group denoted by $G^5$ was a polyoxyethylene group having a molecular weight of about 600. The silicone VI was a dimethylpolysiloxane in the form of an aqueous emulsion containing 30% by weight of the dimethylpolysiloxane. The silicone VII was a polyoxyalkylene-containing diorganopolysiloxane expressed by the formula

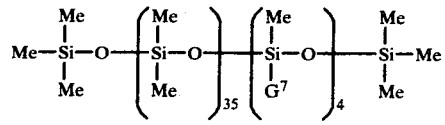

in which the polyoxyalkylene pendant group denoted by $G^7$ was a polyoxyethylene-polyoxypropylene copolymeric group having a molecular weight of about 1500.

Following are the details of the test, in which the evaluation of the touch of the treated fabric was undertaken by the organoleptic test by several skilled panel members as well as by the measurement of the coefficients of static friction as a determinant factor of the fabric touch and the evaluation of the susceptibility to adhesive bonding was undertaken by the measurement of the adhesive bonding strength between the test cloth treated with each of the silicones and a hot-melt type adhesive lining cloth. Further, the evaluation of the water absorptivity was undertaken by the determination of the time for the complete absorption of a water drop placed on the treated test cloth.

The procedures for the evaluation of the touch by the organoleptic test, adhesive bonding and water absorptivity were as follows.

(a) The working solutions for the treatment of the test cloth were prepared each by dissolving 12 parts by weight of a glyoxal resin (NS-18, a product by Sumitomo Chemical Co.), 4 parts by weight of a curing catalyst recommended by the producer of the glyoxal resin (Cat KX, a product by Sumitomo Chemical Co.) and 1 part by weight of either one of the silicones I to VII in 83 parts by weight of water. The amount of the silicone VI in the form of an aqueous emulsion was calculated on the net content of the silicone in the emulsion.

(b) A 65:35 blended yarn fabric of broad cloth of polyester and cotton was dipped in the treatment solution followed by squeezing in a roller such that the amount of the solution taken up by the cloth was 80 to 90% based on the weight of the dry cloth. The test cloth thus wet with the solution was dried at 100° C. for 3 minutes and then subjected to curing by heating at 160° C. for 3 minutes followed by rinse with warm water at 40° C. for 30 seconds and drying at 110° C. for 1 minute.

(c) The thus treated test cloth was subjected to the organoleptic test by touching with finger to evaluate the improvement in the touch.

(d) The above prepared treated test cloth was cut into a test piece of 16 cm × 16 cm wide and adhesively bonded with a hot melt type adhesive lining cloth of the same size by pressing at 180° C. for 30 seconds under a pressure of 0.5 kg/cm². The thus laminated test cloths were further cut to give 5 pieces of each 12 cm long and 3 cm wide. These test pieces were subjected to the peeling test in an automatic recording tensile tester at an angle of 180° by pulling at a velocity of 30 cm/minute and the values obtained with the 5 test pieces were averaged and recorded as the adhesive bonding strength.

(e) Water drops of 0.5 ml volume as a whole were placed on the test cloth treated with the silicone in (b) above and the time for complete absorption of the water into the cloth was determined as a measure of the water absorptivity.

The procedure for the determination of the coefficient of static friction of the fabric treated with the silicone was as follows. Thus, each of the silicones I to VII was diluted with water to give an aqueous solution or aqueous dispersion containing 0.5% of the silicone and polyester filaments were treated with this aqueous solution or dispersion in such a manner that the amount of the solution taken up by the filaments was 40 to 50% based on the weight of the dry filaments followed by drying for 24 hours in an air-conditioned room at 25° C. with 60% of relative humidity. The coefficient of static friction of these treated polyester filaments was determined by use of a radar-type instrument for the determination of coefficient of friction.

The table given below summarizes the results obtained in the above tests. In the table, the touch of the treated fabric is expressed in two grades of A for a smooth and pleasant touch and B for a rough and less pleasant touch determined organoleptically.

TABLE

| Silicone No. | I | III | IV | V | VI | VII |
|---|---|---|---|---|---|---|
| Touch, organolipetic | A | A | B | B | A | B |
| Adhesive bonding strength, g/3 cm | 700 | 688 | 634 | 516 | 350 | 550 |
| Water absorptivity, seconds | 5 | 5 | 5 | 5 | 20 | 5 |
| Coefficient of static friction | 0.228 | 0.260 | 0.266 | 0.268 | 0.230 | 0.290 |

What is claimed is:

1. A method for the finishing treatment of a fabric material which comprises soaking the fabric material with a liquid composition comprising, as the effective ingredient thereof, an organopolysiloxane represented by the general formula

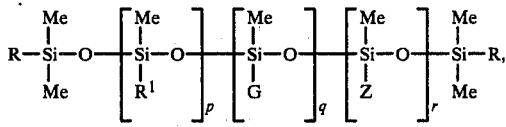

in which Me is a methyl group, $R^1$ is a hydrogen atom or a monovalent hydrocarbon group having from 1 to 14 carbon atoms, G is a polyoxyalkylene group represented by the general formula

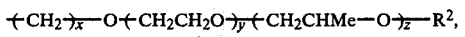

$R^2$ being a hydrogen atom or a monovalent hydrocarbon group having from 1 to 20 carbon atoms, x being a number of 0, 1, 2 or 3 and y and z each being zero or a positive integer not exceeding 200 with the proviso that y+z cannot be equal to zero, Z is an amino-containing group represented by the general formula

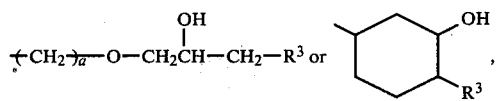

a being zero or 3 and $R^3$ being a substituted or unsubstituted amino group, R is a group selected from $R^1$, G and Z, and p, q and r are each a positive integer not exceeding 800, and drying the fabric material wet with the liquid composition.

* * * * *